United States Patent
Widell et al.

(10) Patent No.: US 9,264,936 B2
(45) Date of Patent: Feb. 16, 2016

(54) COMMON CONTROL CHANNEL ACCESS

(75) Inventors: Daniel Widell, Vikbolandet (SE); Jens Bergqvist, Linköping (SE); Andreas Bergström, Vikingstad (SE); John Walter Diachina, Garner, NC (US); Paul Schliwa-Bertling, Ljungsbro (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 176 days.

(21) Appl. No.: 13/878,474

(22) PCT Filed: Jun. 8, 2011

(86) PCT No.: PCT/SE2011/050707
§ 371 (c)(1),
(2), (4) Date: Apr. 9, 2013

(87) PCT Pub. No.: WO2012/050503
PCT Pub. Date: Apr. 19, 2012

(65) Prior Publication Data
US 2013/0196679 A1    Aug. 1, 2013

Related U.S. Application Data

(60) Provisional application No. 61/391,884, filed on Oct. 11, 2010.

(51) Int. Cl.
*H04W 4/00* (2009.01)
*H04W 28/02* (2009.01)
*H04W 74/08* (2009.01)

(52) U.S. Cl.
CPC ........ *H04W 28/0289* (2013.01); *H04W 74/085* (2013.01)

(58) Field of Classification Search
CPC ..... H04W 8/183; H04W 16/02; H04W 16/06; H04W 16/12; H04W 16/14; H04W 28/08; H04W 28/16; H04W 36/14; H04W 36/22; H04W 48/18; H04W 48/20; H04W 72/082; H04W 72/0453
USPC ........... 455/434, 435.2, 435.3, 454, 447, 450, 455/453
See application file for complete search history.

(56) References Cited

U.S. PATENT DOCUMENTS

| | | | |
|---|---|---|---|
| 8,682,327 B2 * | 3/2014 | Tenny et al. | 455/436 |
| 2011/0053588 A1 * | 3/2011 | Al-Khudairi et al. | 455/424 |
| 2011/0199905 A1 * | 8/2011 | Pinheiro et al. | 370/235 |

FOREIGN PATENT DOCUMENTS

| | | |
|---|---|---|
| EP | 2034755 A1 | 3/2009 |
| WO | 0022873 A1 | 4/2000 |
| WO | 2007024165 A1 | 3/2007 |

OTHER PUBLICATIONS

3rd Generation Partnership Project. 3GPP TS 44.018 V9.5.0 (Jun. 2010). 3rd Generation Partnership Project; Technical Specification Group GSM/EDGE Radio Access Network; Mobile radio interface layer 3 specification; Radio Resource Control (RRC) protocol (Release 9). Jun. 2010, pp. 1-429.

*Primary Examiner* — Temica M Beamer
(74) *Attorney, Agent, or Firm* — Patent Portfolio Builders, PLLC

(57) ABSTRACT

A Mobile Station, MS (115), for a cellular communications network (100), arranged to be camped on one of a plurality of k available Common Control Channels, CCCHs, in a cell (105) in the cellular communications network (100), the MS (115) also being arranged to make successive attempts at uplink CCCH access until the MS (115) gains CCCH access. The MS (115) is arranged to make CCCH access attempt number i on CCCH number x, where x is in the range of 1 ... k, with x determined by a function in the MS (115). Also, a network node, (110), for a cellular communications network, arranged to transmit System Information messages, to the MSs (115) in a cell, and arranged to insert an Information Element, an IE, in an SI message, which IE defines which CCCHs in the cell that an MS (115) may use for uplink CCCH access attempts.

25 Claims, 11 Drawing Sheets

COMMON CONTROL CHANNEL ACCESS

TECHNICAL FIELD

The present invention discloses nodes and methods for improved common control channel access in a cellular communications network.

BACKGROUND

At present, in a GSM/EDGE Radio Access Network, GERAN, it is possible to configure multiple Common Control Channels, CCCHs, in a cell. The CCCHs are used by the GERAN network to perform control of the Mobile Stations, MSs, in the cells of the GERAN network.

A mobile station, an MS, in a GERAN cell will "camp" on, i.e. be attached to, one of the CCCHs which are configured for the cell of the MS, as determined by the so called "paging group" to which the MS belongs, which in turn is determined by the MS's International Mobile Subscriber Identity, its IMSI.

The current method, i.e. the one described above, of assigning MSs in a cell to one of a plurality of CCCHs in a cell has some negative performance implications: First of all, there is a risk of the MSs in a cell being unevenly spread among the CCCHs in the cell, and secondly, even in the case of severely uneven spread of the MSs among the CCCHs, an overloaded CCCH can't be offloaded by the other CCCHs.

Thus, an attempt to alleviate possible overloading of one or more CCCHs in a cell by increasing the number of CCCHs in the cell will not be a certain way of overcoming the problem, since configuring e.g. 4 CCCHs in a cell is not equivalent to increasing the CCCH capacity by a factor of 4.

SUMMARY

It is an objective of the present invention to present a solution which overcomes at least some of the disadvantages given above of present day distribution of MSs among the available common control channels in the cell of the MSs.

This object is addressed by the invention in that it discloses a Mobile Station, an MS, for a cellular communications network. The MS is arranged to be camped on one of a plurality of k available Common Control Channels, CCCHs, in a cell in the cellular communications network. The MS is also arranged to make successive attempts at uplink CCCH access until the MS gains CCCH access. The MS is arranged to make CCCH access attempt number i on CCCH number x, where x is in the range of $1 \ldots k$, where x is determined by a function $f_i$ in the MS.

Thus, by means of the invention, an MS does not need to be restricted to the CCCH on which it is camped when making uplink CCCH attempts. In this manner, the MSs in a cell will be distributed over the CCCHs in the cell in a better manner than previously, in particular when the CCCH on which an MS is camped on is overloaded, something which would otherwise have prevented that particular MS from making successful uplink CCCH attempts.

In embodiments of the MS, in the case of a failed uplink CCCH attempt number i on CCCH number x, the function $f_i$ is arranged to alter the CCCH on which the next uplink CCCH attempt is made in a sequential manner between 1 and k, i.e. uplink CCCH attempt number i+1 is made on CCCH number x+1, uplink CCCH attempt number i+2 is made on CCCH number x+2, and attempt number i+n is made on CCCH number x+n.

In embodiments of the MS, in the case of a failed uplink CCCGH attempt number i on CCCH number x, the function $f_i$ arranged to alter the CCCH number x on which the next uplink CCCH attempt is made in a cyclic manner between 1 and k.

In embodiments of the MS, in the case of a failed uplink CCCH attempt number i on CCCH number x, the function $f_i$ arranged to alter the CCCH number x on which the next uplink CCCH attempt is made in a pseudo-random manner between 1 and k.

In embodiments of the MS, the function $f_i$ is arranged to also prioritize the CCCH number x on which the next uplink CCCH attempt is made according to the traffic class of the traffic for which the MS makes the uplink CCCH attempt.

In embodiments of the MS, the function $f_i$ is arranged to also determine in the range of $1 \ldots k$ in a first manner if the MS belongs to a first group of MSs and in a second manner if the MS belongs to a second group of MSs.

In embodiments of the MS, the function $f_i$ is arranged to also determine the CCCH on which a first Uplink CCCH attempt is made by the MS. The term "a first Uplink CCCH attempt" here refers to a point in time when the MS needs access to the network.

In embodiments of the MS, the function $f_i$ is arranged to determine the CCCH on which a first Uplink CCCH attempt is made by the MS as a function of the MS's International Mobile Subscriber Identity.

In embodiments of the MS, the function $f_i$ is arranged to determine the CCCH on which a first Uplink CCCH attempt is made by the MS to be the CCCH on which the MS is camped.

In embodiments, the MS is an MS for a TDMA cellular communications network, and the function $f_i$ is arranged to provide the MS with more than one uplink CCCH access attempt during one and the same TDMA time frame, in the case of a failed uplink CCCH access attempt.

In embodiments, the MS is arranged to receive and decode a System Information, SI, message, from the cellular communications network, which SI message comprises an Information Element, an IE, with information on which CCCHs that the function $f_i$ in the MS may use.

In embodiments, the MS is an MS for a GSM system.

In embodiments, the MS is an MS for a WCDMA system.

The method also discloses a method for operating a Mobile Station, an MS, in a cellular communications network. The method comprises camping the MS on one of a plurality of k available Common Control Channels, CCCHs, in a cell in the cellular communications network, and also comprises making successive attempts with the MS at uplink CCCH access until the MS gains CCCH access. The method also comprises making CCCH access attempt number i with the MS on CCCH number x, where x is in the range of $1 \ldots k$, and also comprises determining x by a function $f_i$ in the MS.

In embodiments of the method, in the case of a failed uplink CCCH attempt number i on CCCH number x, the method comprises using the function $f_i$ to alter the CCCH on which the next uplink CCCH attempt is made in a sequential manner between 1 and k, i.e. uplink CCCH attempt number i+1 is made on CCCH number x+1, uplink CCCH attempt number i+2 is made on CCCH number x+2, and attempt number i+n is made on CCCH number x+n.

In embodiments of the method, in the case of a failed uplink CCCH attempt number i on CCCH number x, the method comprises using the function $f_i$ to alter the CCCH number x on which the next uplink CCCH attempt is made in a cyclic manner from 1 to k.

In embodiments of the method, in the case of a failed uplink CCCH attempt number i on CCCH number x, the method comprises using the function $f_i$ to alter the CCCH number x on which the next uplink CCCH attempt is made in a pseudo-random manner between 1 and k.

In embodiments of the method, the function $f_i$ is also used to prioritize the CCCH number x on which the next uplink CCCH attempt is made according to the traffic class of the traffic for which the MS makes the uplink CCCH attempt.

In embodiments of the method, the function $f_i$ is also used to determine x in the range of 1 . . . k in a first manner if the MS belongs to a first group of MSs and in a second manner if the MS belongs to a second group of MSs.

The invention also discloses a network node for a cellular communications network. The network node is arranged to transmit System Information, SI, messages, to an MS in a cell in the cellular communications network, and is arranged to insert an Information Element, an IE, in an SI message, which IE defines which CCCHs in the cell that an MS may use for uplink CCCH access attempts.

In different embodiments, the network node is a Radio Base Station or a Base Station Controller for a GSM system, or a Radio Network Controller for a WCDMA system.

BRIEF DESCRIPTION OF THE DRAWINGS

The invention will be described in more detail in the following, with reference to the appended drawings, in which.

DETAILED DESCRIPTION

Figure 1:
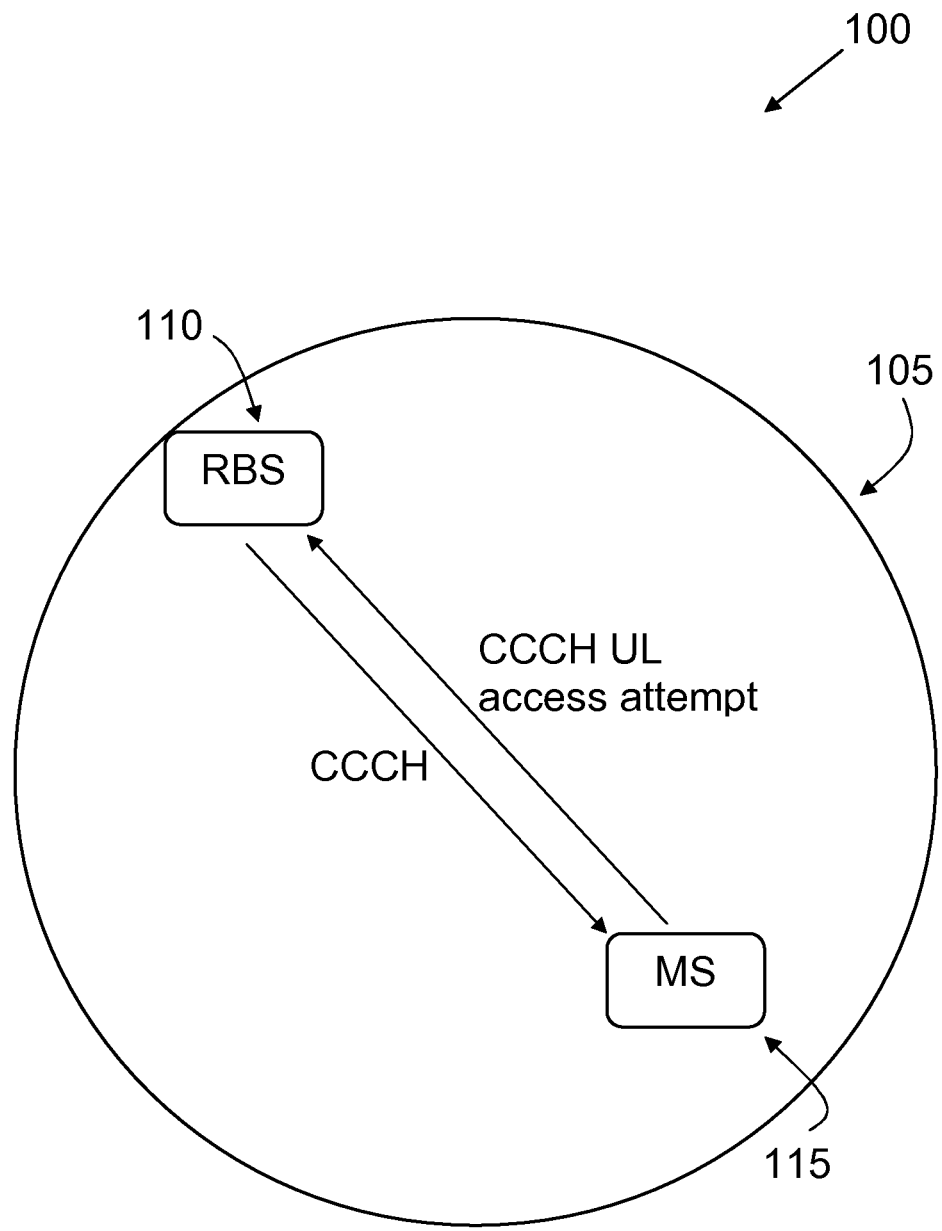
FIG. 1 shows an overview of a prior art cellular communications network.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an overview of a cell 105 in a cellular communications system 100 which comprises a number of such cells. For each cell in the cellular communications system 100 there is a controlling node, a so called Radio Base Station, RBS, shown as 110 in FIG. 1. In each cell, there may be one or more Mobile Stations, MSs, one of which is shown as 115 in FIG. 1. The RBS 110 issues control commands to the MSs in the cell 105, which is done on one of a number of available Common Control Channels, CCCHs, in the cell 105.

Each MS in the cell 105 will be "camped on" one of the available CCCHs in the cell, i.e. each MS will be attached to the RBS 110 on one of the available CCCHs for control purposes. In addition, when an MS in the cell 105 wants to make a so called uplink, UL, CCCH attempt, the MS will make the attempt on the CCCH on which it is camped at present.

In order to achieve a better distribution of MSs on the CCCHs which are available in a cell, an MS of the invention has one or more of the following capabilities, which can either be combined with each other in different combinations or used as "stand-alone" solutions:

1. Making better use of the CCCH resources when more than one CCCH is configured in the cell. This includes pooling of the available CCCHs, and allowing for subsequent access attempts made by one and the same MS to be spread over more than one CCCH, i.e. to be made on more than one CCCH.

2. Dividing the CCCH resources into a subset of resources (which could be overlapping), into which subsets different MS categories (e.g. legacy devices and MTC, Machine Type Communication, devices) can be exclusively assigned or nominally assigned such that they have precedence over devices having a different nominal resource assignment. This allows for safeguarding the use of CCCH resources assigned to different MS categories by mitigating the possibility of any given resource being overloaded.

3. Similarly to the above, allow for safeguarding of CCCH resources exclusively or nominally assigned to legacy devices performing legacy.

4. Allow for an MS to attempt access on more than one uplink CCCH during one and the same access attempt.

The capabilities listed above can be used by an MS of the invention both in the case in which the CCCH uplink access attempt is made solely on the initiative of the MS, i.e. autonomously triggered by the MS's application layer, and in the case in which the CCCH uplink access attempt is made in response to paging of the MS, i.e. a so called solicited access attempt.

An MS 115 of the invention is arranged to make successive attempts at uplink, UL, CCCH access until it, i.e. the MS 115, gains CCCH access, and the MS is arranged to make these successive CCCH attempts as follows: UL CCCH access attempt number i is made on CCCH number x, where x is in the range of 1 . . . k. The CCCH number x is determined by a function $f_i$ which the MS 115 is equipped with.

In the following, reference will be made to "failed Uplink CCCH attempts". Failure is here taken to mean that the MS 115 does not gain UL access, which can either be noticed by the MS 115 in that it fails to receive any message granting it access to the network, or by an explicit message from the RBS 110 informing the MS 115 of the failure.

Figure 2:
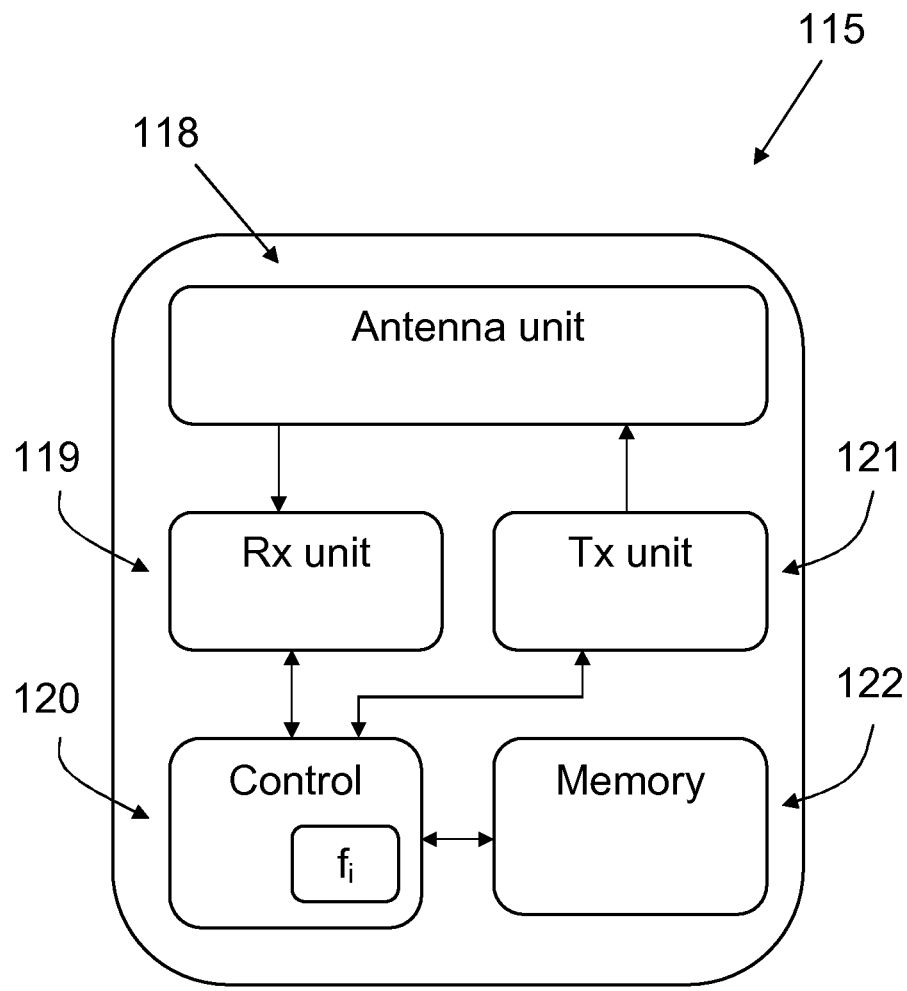
FIG. 2 shows a block diagram of an MS.

Before the function of the MS 115 of the invention and the function $f_i$ are described further, a block diagram of an example of the MS 115 will be described with reference to FIG. 2. As shown in FIG. 2, the MS 115 comprises an antenna unit for receiving and transmitting signals from/to the RBS 105 in FIG. 1. In addition, there is a Receiver Unit (Rx) 119 for reception of signals from the antenna unit 118, and a transmitter unit (Tx) 121 for the transmission of signals via the antenna unit 118. The function of both the Receiver Unit 119 and the Transmitter Unit 121 is at least in part controlled by a Control Unit 120, which, for example, can be a microprocessor. The Control Unit 120 is, in general, arranged to control all or parts of the function of the MS 115. The MS 115 also comprises a Memory Unit 122, which is accessed by the Control Unit 120.

As is also shown in FIG. 2, the MS 115 comprises a function $f_i$ which is the function that is arranged to determine which of the k available CCCH channels in the cell 100 that the MS should make its UL CCCH attempt or attempts on. As shown in FIG. 2, the function $f_i$ can be arranged in the control unit 120, or, alternatively, it can be arranged as a separate function in the MS 115, where it is accessed by the control unit 120, as an alternative to which the function $f_i$ is arranged as a separate component in the MS 115, to control the choice of CCCH channel on which to make the CCCH uplink attempts.

As mentioned previously, the MS 115 is arranged to be camped on one of a plurality of k available Common Control Channels, CCCHs, in the cell 105. When the MS 115 needs to initiate uplink communication, i.e. communication to the RBS 110, it starts this by making a so called CCCH Uplink access attempt, which it, as disclosed herein, does on CCCH nr x, where x is in the interval of 1 . . . k, and is determined by the function $f_i$. If the UL CCCH access attempt is successful, i.e. the MS 115 acquires an uplink connection to the RBS 110, no further UL CCCH attempts need be made. However if the UL CCCH attempt is unsuccessful, the MS 115 is arranged to make further UL CCCH attempts until an uplink connection is acquired. The function $f_i$ determines on which CCCH channel k that the UL CCCH attempts are made, both the initial UL CCCH attempt and, where necessary, the following attempts as well.

Suitably, the function $f_i$ uses the MS's so called IMSI, the International Mobile Subscriber Identity, in order to determine which CCCH to make the UL CCCH access attempts on. Other factors which may also be used by the function $f_i$ in other embodiments in order to determine which CCCH to make the UL CCCH access attempts on include, for example, subscription level, e.g. preferential treatment for customers who pay more, the type of traffic to be transmitted by the MS, the capacity of the MS so that newer MSs with a higher capacity are treated differently than older devices with lower capacity, the access type, so that, for example, emergency calls are given more preferential treatment, and the traffic load in the network at the moment.

In brief, this principle can be explained as follows: Assume a cell with 4 CCCHs, although the invention is applicable for all multiple CCCH scenarios. In order to mitigate the drawbacks of prior art solutions, when an MS 115 wants to make an UL CCCH access (i.e. RACH, Random Access Channel), regardless of which CCCH number that the MS 115 "camped" on at present, the MS will make its first UL CCCH access attempt on CCCH number $f_1(IMSI)$, i.e. the first CCCH on which an Uplink attempt is made will be determined as a function of the MS's IMSI. If UL CCCH access attempt on CCCH number $f_1(IMSI)$ fails (e.g. due to contention resolution failure), the second attempt will be conducted on CCCH number $f_2(IMSI)$ and so forth. Thus, attempt number i will be conducted on CCCH number $f_i(IMSI)$.

In one embodiment, if UL CCCH attempt number i on CCCH number x fails, the function $f_i$ alters the CCCH on which the next UL CCCH attempt is made in a sequential manner between 1 and k, i.e. so that UL CCCH attempt number i+1 is made on CCCH number x+1, UL CCCH attempt number i+2 is made on CCCH number x+2. In general, in this embodiment, the function $f_i$ chooses the CCCH for the next UL CCCH attempt so that attempt number i+n is made on CCCH number x+n, until UL access is acquired by the MS 115.

Figure 3:
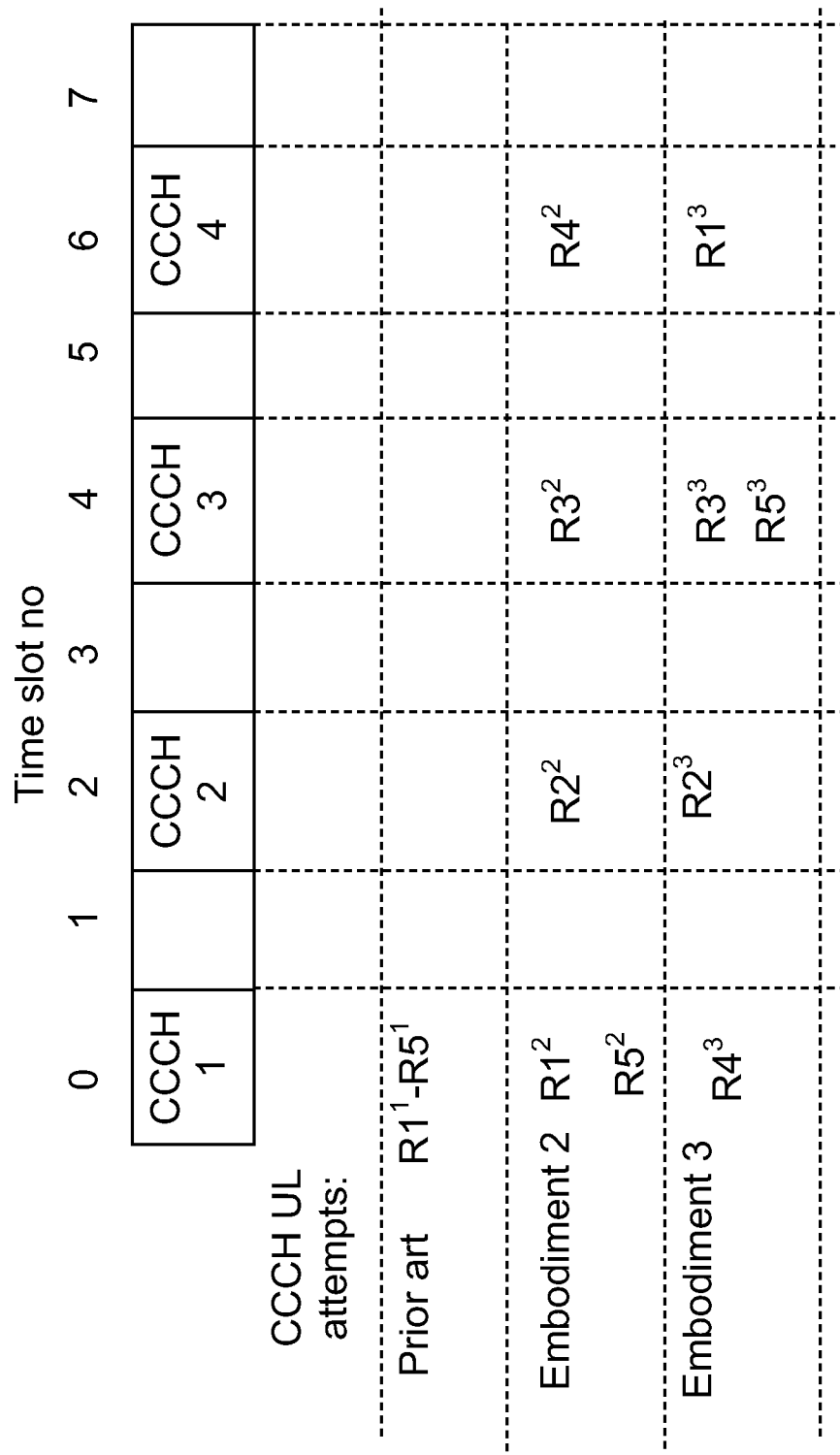
FIGS. 3-9 show time slot and CCCH usage in various embodiments.

In one version of this embodiment, if UL CCCH attempt number i on CCCH number x fails, the function $f_i$ alters the CCCH number x on which the next UL CCCH attempt is made in a cyclic manner between 1 and k. This would work as follows: as mentioned previously, the first UL CCCH access attempt suitably occurs on the CCCH on which the MS 115 is camped at the moment, and, in the case of a failed first attempt, subsequent attempts are made on the next CCCH number, as determined in a cyclic, right-shift fashion by the function $f_i$. Assume that there are 4 CCCHs in the cell 105 of the MS 115. How the CCCHs for the UL CCCH attempts are determined can then be defined as $f_i(IMSI)=((f_{camping}(IMSI)+i-2) \mod k)+1$. This embodiment is depicted in FIG. 3 as "embodiment 2", where superscript 2 indicates the embodiment, and five UL CCCH access attempts are shown, denoted R1 to R5, with subscript "i" denoting access attempt i, with $f_{camping}(IMSI)=1$. Naturally, the cyclic right-shift fashion can instead be replaced by a cyclic left shift or other permutations of cyclic shifts.

In another version, in the case of a failed uplink CCCH attempt, the function $f_i$ alters the CCCH number x on which the next UL CCCH attempt is made in a pseudo-random manner between 1 and k. This would work as follows: as mentioned previously, the first UL CCCH access attempt suitably occurs on the CCCH on which the MS 115 is camped at the moment, and, in the case of a failed first attempt, subsequent attempts are made on an CCCH number which is determined in a pseudo-random manner between 1 and k, where k is the total number of available CCCHs in the cell 105, i.e. in the example used previously, k=4.

Determining a CCCH for an UL CCCH access attempt in a pseudo-random manner can, in general, be done starting with any UL CCCH access attempt following a first such attempt, or generally for any subset of the UL CCCH access attempts (including the entire set of access attempts). In order to illustrate this principle, reference will be made to FIG. 3, where the embodiment with pseudo-random CCCH generation by the function $f_i$ is shown as "Embodiment 3". In the example shown in FIG. 3 as "Embodiment 3", $f_{camping}(IMSI)$ has been chosen as 1, i.e. $f_{camping}(IMSI)$ has been chosen within the range of available CCCHs, and k, i.e. the number of available CCCH channels has been chosen as 4. Further, the MS in question makes 5 access attempts, denoted R1 to R5 in FIG. 3, with the superscript 3 indicating example 3, and the subscript "i" denoting access attempt i. As an example, consider the following pseudo-random sequence, which will yield the results depicted in FIG. 3 as "embodiment 3":

$f_1(IMSI)=4$ $f_2(IMSI)=2$ $f_3(IMSI)=3$ $f_4(IMSI)=1$ $f_5(IMSI)=3$

In the embodiments referred to in FIG. 3 as embodiments 2 and 3, which have been described above, it has been shown how the function $f_i$ in the MS 115 "generates" a CCCH on which to make the next UL CCCH access attempt. In a further embodiment, which will be referred to as "embodiment 4", and shown in FIG. 4 as such, the function $f_i$ is arranged to "safeguard" the CCCH resources in the cell of the MS with regard to different traffic classes for MSs which are equipped with the function $f_i$. This is done by letting the function $f_i$ prioritize the CCCH number x on which the next UL CCCH attempt is made by an MS according to the traffic class of the traffic for which the MS 115 makes the UL CCCH attempt.

This can be explained as follows: In prior art systems, there is no CCCH resource differentiation between traffic classes ("classes" in the sense that, for example, one MS may be a person making an emergency call, while another MS might be an electrical meter reporting power usage.) for the general population of MSs that attempt UL CCCH access, i.e. all access attempts are treated as having equal importance in an operator's network.

Thus, since, in prior art, the UL CCCH is a shared resource, a large amount of non-urgent MSs may overload the entire CCCH resource, thereby making it nearly impossible for any MS to make a successful CCCH access attempt, and effectively blocking all network access in the current cell.

The mechanism referred to herein as "embodiment 4" could also be expanded to allow for several groups of differently prioritized MSs, where the concept of a prioritized MS ultimately stems from the fact that different priorities will be associated with the applications supported by different MS. Multiple applications having different priorities may even be supported within the context of a specific MS, and as such, successive access attempts from one and the same MS may have different priorities for UL access attempts.

In order to further explain this embodiment, i.e. embodiment 4, regard two sets of MSs, one with traffic denoted as "prioritized" and the other with traffic denoted as "non-prioritized". By providing these different sets of MSs with different input parameters to their respective CCCH functions $f_i$, it will be possible to create "subsets" of CCCHs where only higher prioritized traffic is allowed, or where a combination of lower and higher prioritized traffic is allowed.

It's again assumed that the number of CCCHs in the cell of the MSs, i.e. the variable k, is equal to 4. Now, let the CCCH functions $f_i$ for the prioritized set of MSs be defined in the interval [1, 4] and the function $f_i$ for the non-prioritized set of MSs be defined in the interval [3, 4]. If we also let the function $f_i$ of an MS generate the CCCH for the MS's UL CCCH access attempt by means of the MS's IMSI, i.e. $f_i$(IMSI), this will then give us:

$$f_i^{prioritized}(IMSI) \in [1,4]$$

$$f_i^{non-prioritized}(IMSI) \in [3,4]$$

Figure 4:
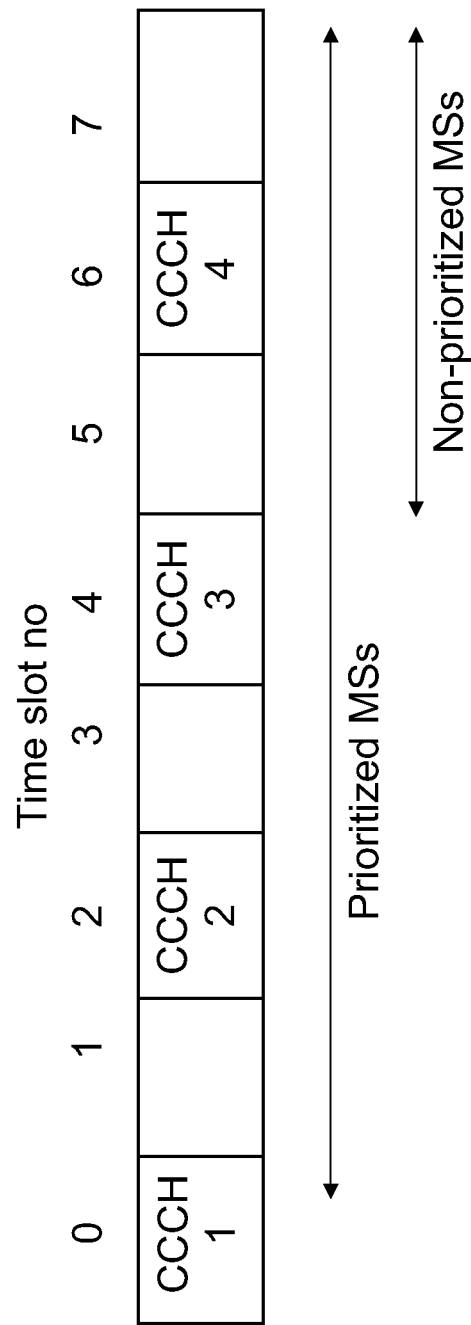

The possible outcomes for the different CCCH functions $f_i$ are depicted in FIG. 4, which shows that the prioritized MSs will make their UL CCCH access attempts on CCCHs [1, 4], and the non-prioritized MSs will make their UL CCCH access attempts on CCCHs [3, 4].

As shown in FIG. 4, in the embodiment referred to as "embodiment 4", the prioritized MSs have an evenly distributed probability over all CCCHs, i.e. in this case CCCHs 1-4, and the non-prioritized MSs have an evenly distributed probability over "their" CCCHs, in this case CCCHs 3 and 4. In a further embodiment in which the function $f_i$ is also designed to safeguard the CCCH resources in the cell of the MS with regard to different traffic classes for MSs which are equipped with the function $f_i$, the function $f_i$ may also be biased, so that CCCHs chosen for higher prioritized traffic classes have a lower probability of overlapping with the CCCH chosen for a differently (lower) prioritized traffic class. Use embodiment 3 from above as an example, and let the function $f_i$ again use an MS's IMSI in order to generate the CCCH for the MS's next CCCH UL access attempt, i.e. $f_i$(IMSI).

Figure 5:
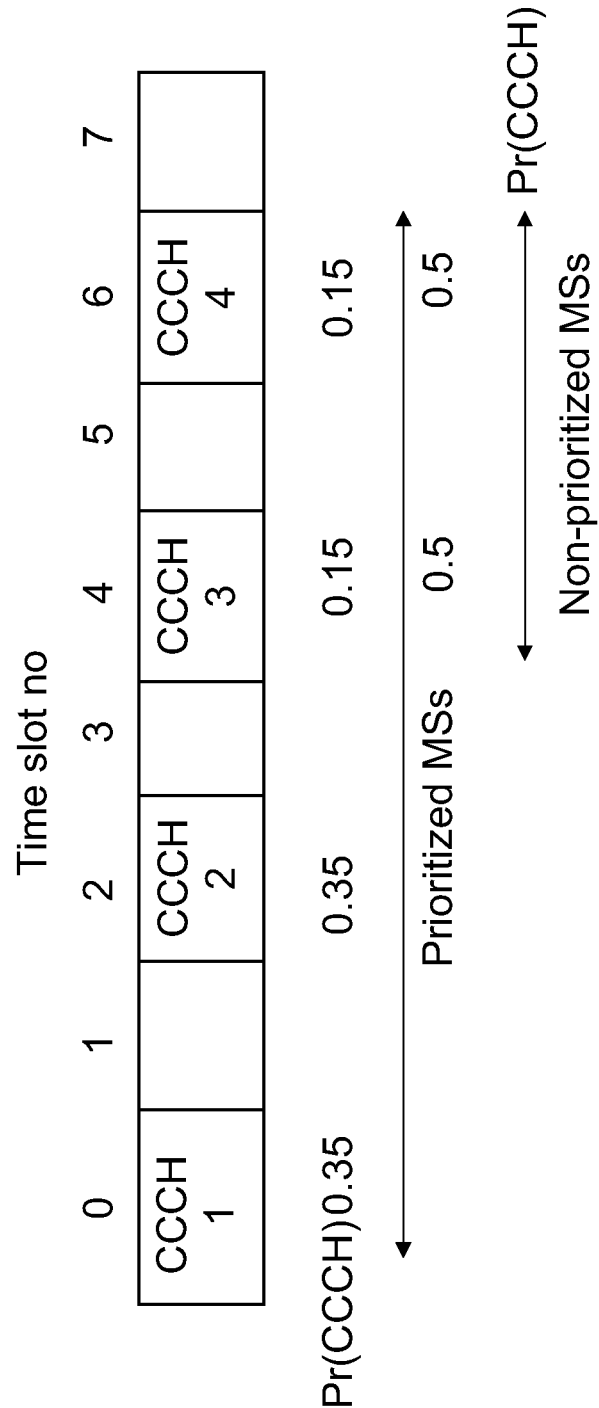

If we further regard the IMSI as a stochastic variable; then $f_i^{prioritized}$(IMSI) may be chosen such that $Pr\{f_i^{prioritized}$(IMSI)$\in\{1,2\}\} > Pr\{f_i^{prioritized}$(IMSI)$\in\{3,4\}\}$, IMSI$\in I_{IMSI}$. If, within these subcategories of CCCH indices, the distribution for the prioritized MS is still uniform and the probabilities Pr for the CCCHs 1-4 are as below:

$$Pr\{f_i^{prioritized}(IMSI)\in\{1,2\}\}=0.7$$

$$Pr\{f_i^{prioritized}(IMSI)\in\{3,4\}\}=0.3, IMSI \in I_{IMSI}.$$

then the probability of generating a CCCH index for the prioritized MS will be as depicted in FIG. 5, which also has the heading CCCHs, Embodiment 5. Here, it is assumed that the distribution of the CCCHs for non-prioritized MS is still uniform.

Embodiments 4 and 5 were thus aimed at safeguarding CCCH resources for different traffic classes. The present invention also encompasses embodiments which will safeguard CCCH resources for "legacy" MSs, i.e. MSs which are not equipped with the function $f_i$, but which always use the CCCH on which they are camped for their UL CCCH access attempts. Such MSs, i.e. "legacy" MSs may need to be safeguarded from new categories of MS (i.e. MSs which are equipped with embodiments of the function $f_i$ as described herein), so that the legacy MSs are not adversely impacted, e.g. by having their ability to make emergency calls adversely impacted.

This can be achieved by means of arranging the function $f_i$ to also determine the number x of the CCCH on which UL CCCH access attempts are made in the range of 1 . . . k in a first manner if the MS (115) belongs to a first group of MSs and in a second manner if the MS (115) belongs to a second group of MSs. Embodiments of this will be described below as embodiments 6, 7 and 8.

For such cases, in one embodiment of the invention, the legacy MSs in a cell or in an entire system, use a limited number or subset of the available CCCHs (<4, if the total amount of CCCHs is 4), and the "new" MSs use another subset of the available CCCHs, e.g. all 4. The CCCHs for the new devices may, of course, be further sub-divided as described with the embodiments above. For simplicity however, no such sub-division will be assumed in the following examples of the embodiments which safeguard legacy MSs.

Figure 6:
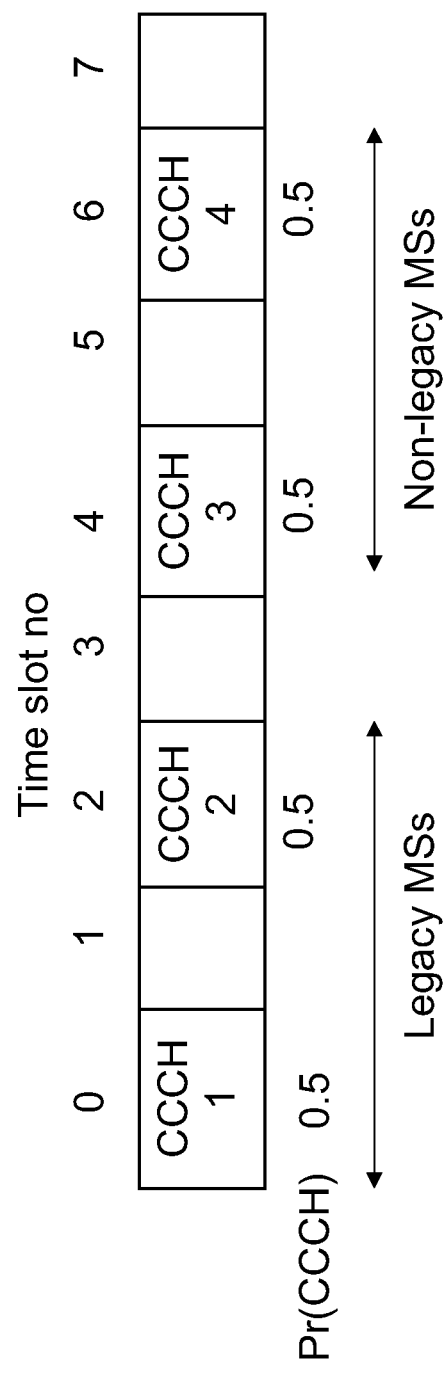

In an embodiment referred to as embodiment 6, assume that 4 CCCHs are configured in a cell, out of which 2, CCCHs 1 and 2, are devoted to legacy MSs. The legacy MSs will not be able to spread their accesses randomly, but will use only their CCCH based on their IMSI, which is also the CCCH on which they are camped. They would thus be more or less evenly distributed between CCCHs 1 and 2 in this example. Assume further that 2 more CCCHs, numbers 3 and 4, are configured for MSs with the function $f_i$. The new ("non-legacy") MSs could then be allowed to only make UL CCCH access attempts on CCCHs 3 and 4, as illustrated in FIG. 3. In addition, as is also shown in FIG. 6, the function $f_i$ of the new MSs, is arranged to let the CCCHs on which the new MSs make their UL CCCH access attempts be evenly distributed, i.e. in this case so that the probability of using CCCHs 3 and 4 for UL CCCH access attempts will be 50% for each of CCCH 3 and 4.

Figure 7:
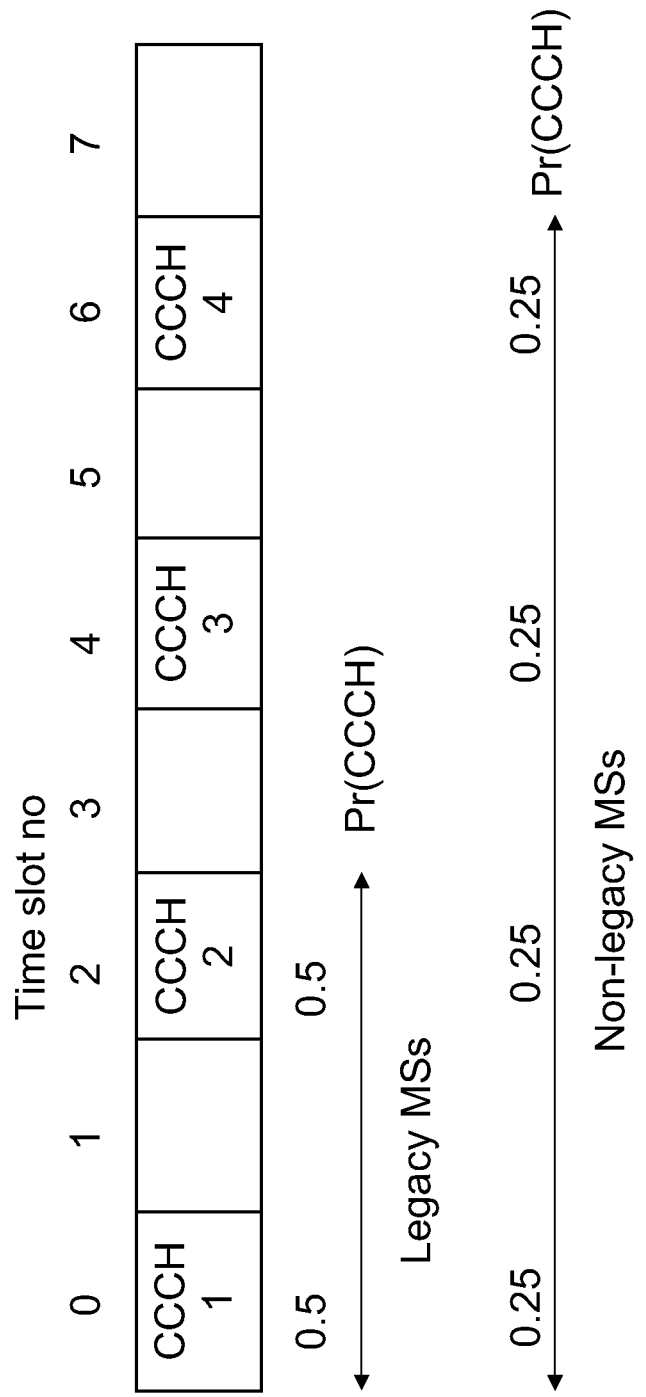
Figure 8:
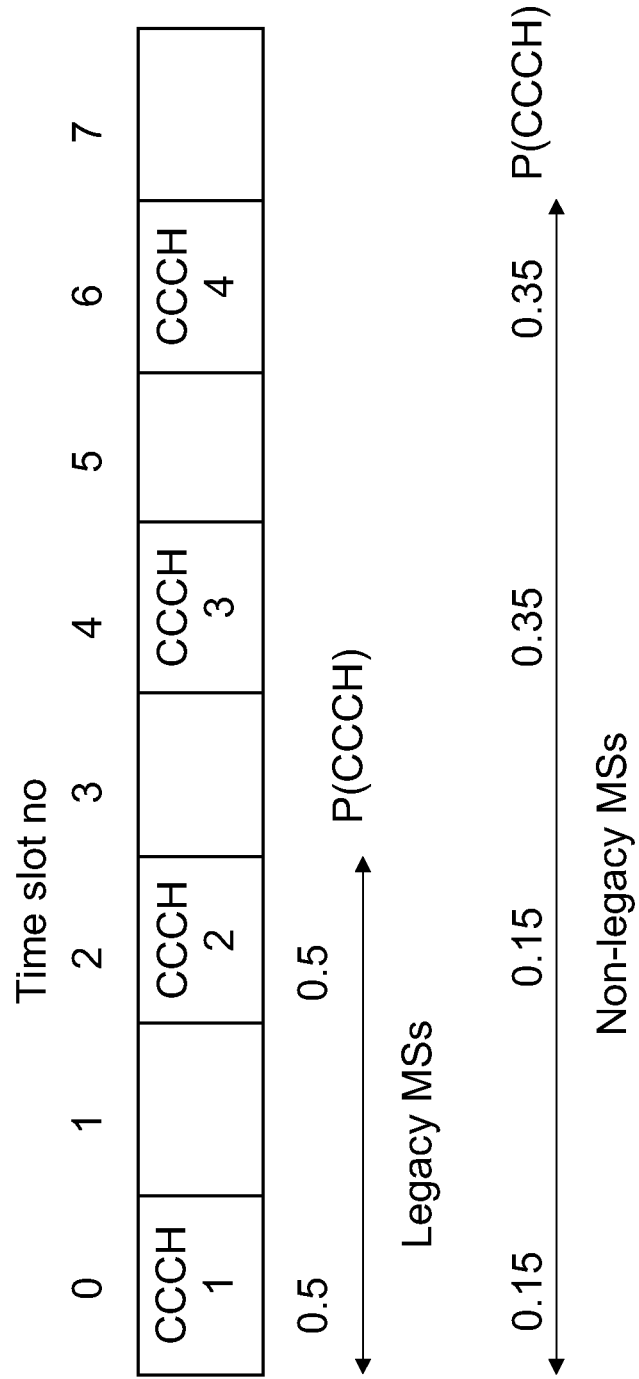

In a further embodiment, here referred to as embodiment 7, the same assumptions are made as in embodiment 6, but with the difference that the new MSs may perform UL CCCH access attempts on all of the CCCHs available in the cell, with equal probability. This is illustrated in FIG. 7 as embodiment 7, in which four CCCHs are assumed.

In embodiment 8, we make the same assumptions as in embodiments 6 and 7, but with the difference that the new (non-legacy) MSs may perform UL CCCH access attempts on all (here, 4 CCCHs {1, 2, 3, 4}) with a biased probability in their functions $f_i$, so that the MSs have a higher probability of making their UL CCCH access attempts mainly on CCCHs 3 and 4. This is illustrated in FIG. 9, which shows a probability of 0.15 for CCCHs 1 and 2, and 0.35 each for CCCHs 3 and 4.

In one embodiment, here referred to as embodiment 9, the MS 115 is an MS for a TDMA cellular communications network, and the function $f_i$ in the MS provides the MS with more than one UL CCCH access attempt during one and the same TDMA time frame in the case of a failed UL CCCH access attempt.

Figure 9:
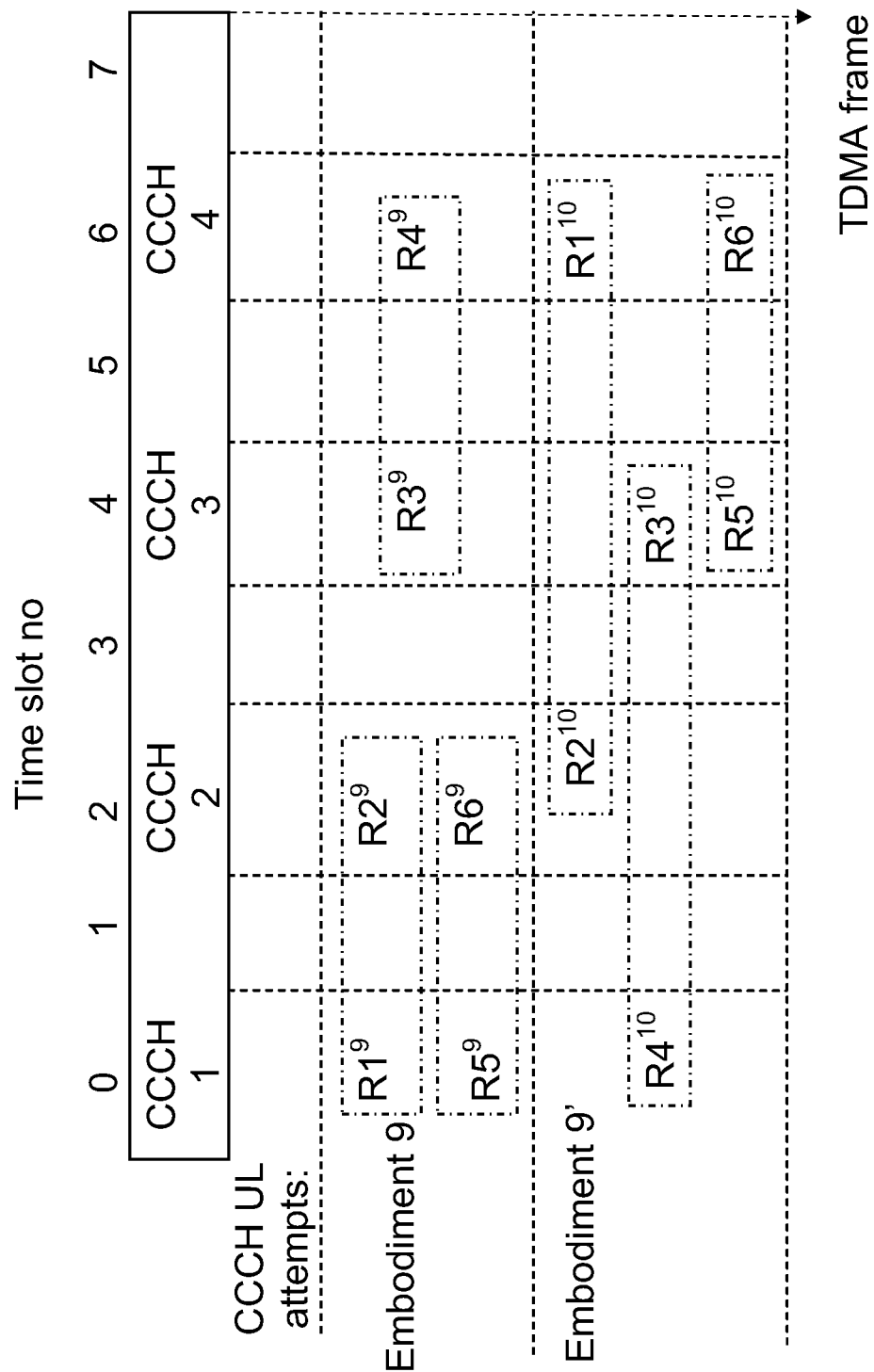

Embodiment 9 is illustrated in FIG. 9 with the superscript 9. FIG. 9 shows six successive UL CCCH access attempts being made, with the first two attempts (i.e. R1 and R2) being made using the same TMDA frame and comprising the first access attempt period, the next two access attempts (R3 and R4) are made using the same TMDA frame comprising the second access attempt period, and access attempts R5 and R6 are made using the same TMDA frame which comprises the third access attempt period.

FIG. 9 also shows a version of embodiment 9, shown in FIG. 9 as embodiment 9'. In this version of embodiment 9, an MS also makes more than one access attempt within the same TDMA frame, but uses a different sequence of CCCHs as compared to embodiment 9.

An MS of the invention will be arranged to receive information on which CCCHs it may perform its UL CCCH access attempts, i.e. this information will be needed by the function $f_i$ in the MS. Regarding the CCCHs which are to be used by "legacy" MSs, this is of course those CCCHs which are broadcasted in the legacy information element in System Information (SI) message as per legacy procedures.

Any legacy device will then, after reading the broadcasted system info as described above, only be aware of the legacy configured CCCHs and perform access according to legacy procedures, i.e. with all access attempts on the CCCH which it is mapped to, given its IMSI.

However, the CCCHs to be used an MS of the invention may be inserted as a new information element, IE, in the appropriate broadcasted SI message, and only inventive MSs will be able to decode this new information element, as opposed to legacy MSs.

Thus, the MS 115 is arranged to receive and decode a System Information, SI, message, from the cellular communications network 100, which SI message comprises an Information Element, an IE, with information on which CCCHs that the function $f_i$ in the MS may use.

The exact method of how the MS 115 should perform its UL CCCH attempts, i.e. the exact mechanism of the function $f_i$, may be communicated to the MSs via any of the means as listed below (or any combination thereof), i.e.:

1. The MS 115 is pre-configured on how to perform UL CCCH access.
2. The MS 115 is configured via Over-The-Air method (OTA) regarding how to perform UL CCCH access
3. The MS 115 is configured using NAS (Non Access Stratum) signaling at registration procedures like Attach to the network, Routing/Location/Tracking Area or Session management procedures like PDP Context Activation.
4. Broadcasting this information in the system information in the cell.

The invention also discloses a network node for a cellular communications network, arranged to transmit the information on which CCCHs that the function $f_i$ in the MS 115 may use as a System Information, SI, message. In various embodiments, the network node is a Radio Base Station, an RBS, or a Base Station Controller, BSC, for a GSM system, or a Radio Network Controller for a WCDMA system.

Figure 10:
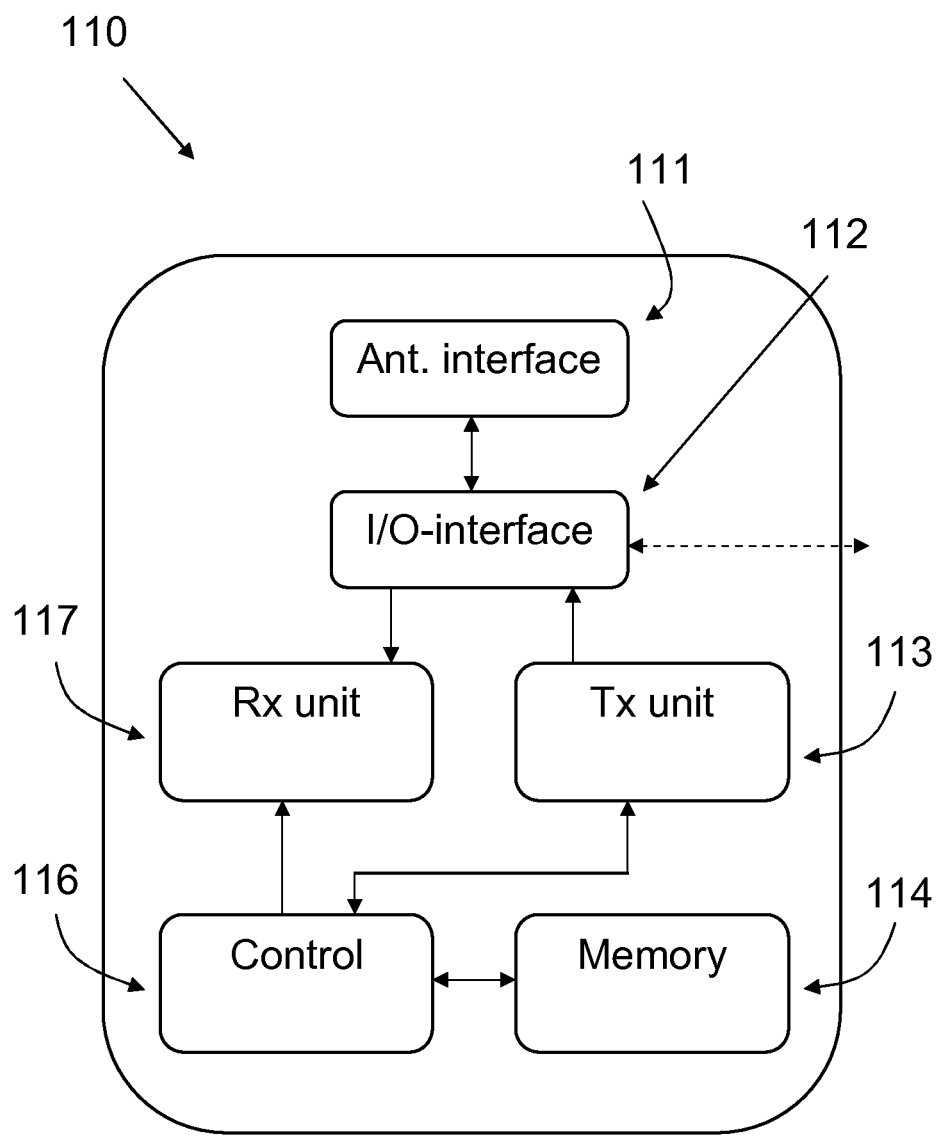
FIG. 10 shows a block diagram of a network node.

FIG. 10 shows a schematic block diagram of such a network node 110 for the cellular communications network 100. The network node 110 is arranged to transmit System Information, SI, messages, to the MSs 115 in a cell in the cellular communications network, and is arranged to insert an Information Element, an IE, in an SI message, which IE defines which CCCHs in the cell that the MS 115 may use for its UL CCCH access attempts.

As shown in FIG. 10, the network node 110 comprises an antenna interface 111 for interfacing with an antenna which is internal or external to the network node 110, and which is used for receiving and transmitting signals from/to the MS 115. The network node 110 also comprises an I/O-interface 112 for interfacing both with the antenna interface 112 and for handling the network node's communication with other nodes which are not connected to the network node by means of wireless transmissions.

As is also shown in FIG. 10, the network node 1100 also comprises a Receiver Unit (Rx) 117 for reception of signals from the antenna interface 111 via the I/O interface 112, and a transmitter unit (Tx) 113 for the transmission of signals from the antenna unit interface 111 via the I/O interface 112. The function of both the Receiver Unit 117 and the Transmitter Unit 113 is at least in part controlled by a Control Unit 116, which, for example, can be a microprocessor. The Control Unit 116 is, in general, arranged to control all or parts of the function of the network node 110. The network node 110 also comprises a Memory Unit 114, which is accessed by the Control Unit 116.

In different embodiments, the network node 110 is either a Radio Base Station, a Base Station Controller for a GSM system or a Radio Network Controller for a WCDMA system.

Figure 11:
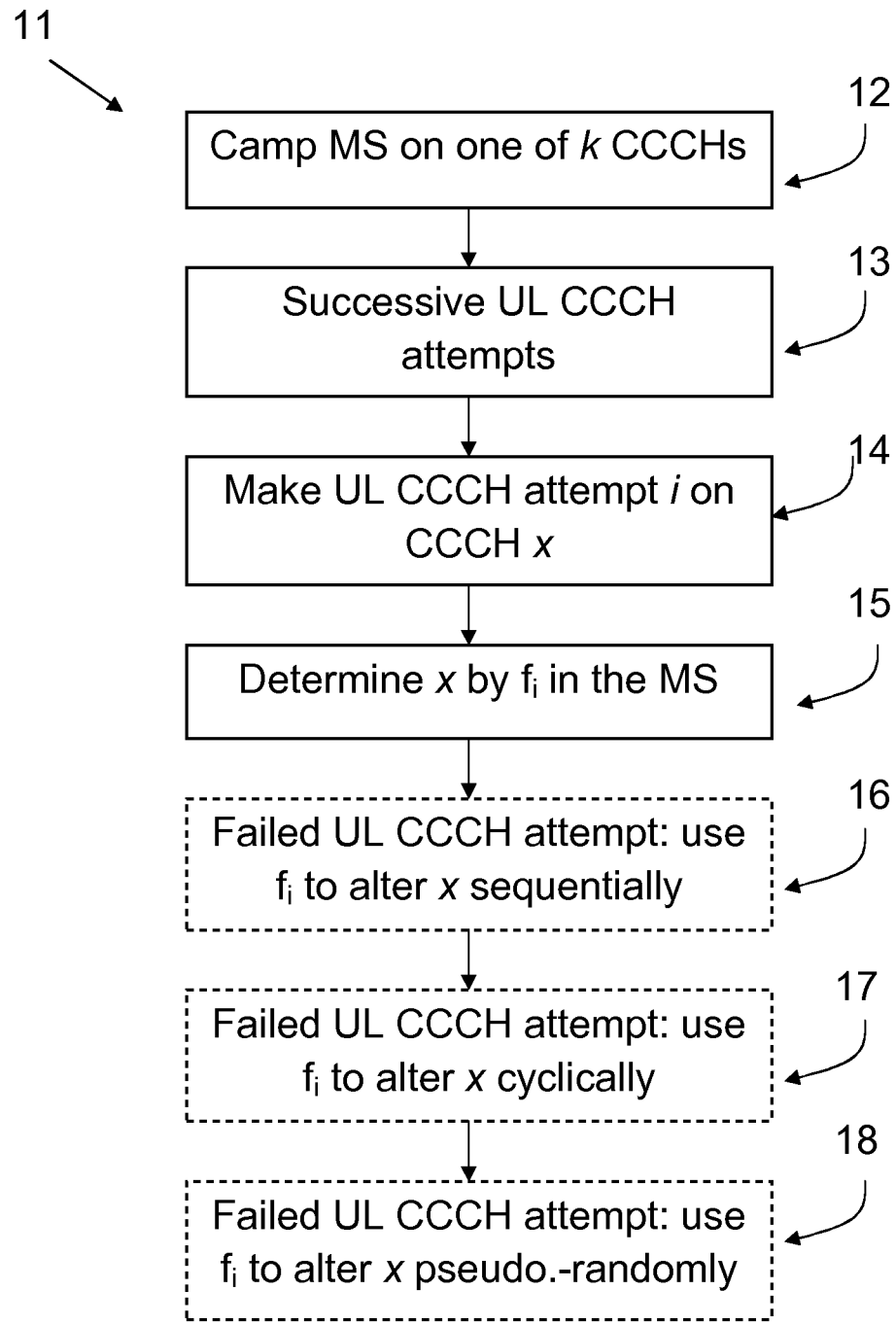
FIG. 11 shows a schematic flowchart of a method.

FIG. 11 shows a flowchart of a method 11. Reference numbers from FIGS. 1 and 2 will also be used in order to describe the method. The method 11 is for operating a Mobile Station, an MS 115, in a cellular communications network 100, and comprises, as shown in step 12, camping the MS on one of a plurality of k available Common Control Channels, CCCHs, in a cell 105 in the cellular communications network 100. The method 11 also comprises, step 13, making successive attempts with the MS at uplink CCCH access until the MS 115 gains CCCH access. In addition, the method 11 comprises, step 14, making CCCH access attempt number i with the MS on CCCH number x, where x is in the range of 1 . . . k, and also comprises, step 15, determining x by a function $f_i$ in the MS 115.

In embodiments according to the method 11, in the case of a failed uplink CCCH attempt number i on CCCH number x, the method comprises, step 16, using the function $f_i$ to alter the CCCH on which the next uplink CCCH attempt is made in a sequential manner between 1 and k, i.e. uplink CCCH attempt number i+1 is made on CCCH number x+1, uplink CCCH attempt number i+2 is made on CCCH number x+2, and attempt number i+n is made on CCCH number x+n.

In embodiments according to the method 11, in the case of a failed uplink CCCH attempt number i on CCCH number x, the method comprises, step 17, using the function $f_i$ to alter the CCCH number x on which the next uplink CCCH attempt is made in a cyclic manner from 1 to k.

In embodiments according to the method 11, in the case of a failed uplink CCCH attempt number i on CCCH number x, the method comprises, step 18, using the function $f_i$ to alter the CCCH number x on which the next uplink CCCH attempt is made in a pseudo-random manner between 1 and k.

In embodiments according to the method 11, the function $f_i$ is also used to prioritize the CCCH number x on which the next uplink CCCH attempt is made according to the traffic class of the traffic for which the MS 115 makes the uplink CCCH attempt.

In embodiments according to the method 11, the function $f_i$ is also used to determine x in the range of 1 . . . k in a first manner if the MS 115 belongs to a first group of MSs and in a second manner if the MS 115 belongs to a second group of MSs.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

The invention claimed is:

1. A Mobile Station (MS) for a cellular communications network, arranged to be camped on one of a plurality of k available Common Control Channels (CCCHs) in a cell in the cellular communications network, and to make successive attempts at uplink CCCH access until the MS gains CCCH access, and wherein the MS is further arranged to make CCCH access attempt number i on CCCH number x, where x is in the range of 1 . . . k, where x is determined by a function $f_i$ in the MS.

2. The MS of claim 1, in which, in the case of a failed uplink CCCH attempt number i on CCCH number x, the function $f_i$ is arranged to alter the CCCH on which the next uplink CCCH attempt is made in a sequential manner between 1 and k, so that uplink CCCH attempt number i+1 is made on CCCH number x+1, uplink CCCH attempt number i+2 is made on CCCH number x+2, and attempt number i+n is made on CCCH number x+n.

3. The MS of claim 1, in which, in the case of a failed uplink CCCH attempt number i on CCCH number x, the function $f_i$ is arranged to alter the CCCH number x on which the next uplink CCCH attempt is made in a cyclic manner from 1 to k.

4. The MS of claim 1, in which, in the case of a failed uplink CCCH attempt number i on CCCH number x, the function $f_i$ is arranged to alter the CCCH number x on which the next uplink CCCH attempt is made in a pseudo-random manner between 1 and k.

5. The MS of claim 1, in which the function $f_i$ is also arranged to prioritize the CCCH number x on which the next uplink CCCH attempt is made according to the traffic class of the traffic for which the MS makes the uplink CCCH attempt.

6. The MS of claim 1, in which the function $f_i$ is arranged to also determine x in the range of 1 . . . k in a first manner if the MS belongs to a first group of MSs and in a second manner if the MS belongs to a second group of MSs.

7. The MS of claim 1, in which the function $f_i$ is arranged to also determine the CCCH on which a first Uplink CCCH attempt is made by the MS.

8. The MS of claim 7, in which the function $f_i$ is arranged to determine the CCCH on which Uplink CCCH attempts are made by the MS as a function of the International Mobile Subscriber Identity of the MS.

9. The MS of claim 7, in which the function $f_i$ is arranged to determine the CCCH on which a first Uplink CCCH attempt is made by the MS to be the CCCH on which the MS is camped.

10. The MS of claim 1, being an MS for a TDMA cellular communications network, in which the function $f_i$ is arranged to provide the MS with more than one uplink CCCH access attempt during one and the same TDMA time frame, in the case of a failed uplink CCCH access attempt.

11. The MS of claim 1, being arranged to receive and decode a System Information (SI) message, from the cellular communications network, which SI message comprises an Information Element (IE) with information on which CCCHs that the function $f_i$ in the MS may use.

12. The MS of claim 1, in which the function $f_i$ is preconfigured regarding how to determine CCCH number x.

13. The MS of claim 1, being arranged to have the function $f_i$ configured via an Over-The-Air (OTA) method regarding how to determine CCCH number x.

14. The MS of claim 1, being arranged to have the function $f_i$ configured via Non-Access Stratum (NAS) signaling at a registration procedure to the network.

15. The MS of claim 1, being an MS for a GSM system.

16. The MS of claim 1, being an MS for a WCDMA system.

17. A method for operating a Mobile Station (MS) in a cellular communications network, the method comprising: camping the MS on one of a plurality of k available Common Control Channels (CCCHs) in a cell in the cellular communications network and making successive attempts with the MS at uplink CCCH access until the MS gains CCCH access, and wherein the method further includes making CCCH access attempt number i with the MS on CCCH number x, where x is in the range of 1 . . . k, and determining x by a function $f_i$ in the MS; and wherein the method further includes initiating, by the MS, a communication with a network node based on the camping of the MS on the one of the plurality of k available CCCHs.

18. The method of claim 17, according to which, in the case of a failed uplink CCCH attempt number i on CCCH number x, the method comprises using the function $f_i$ to alter the CCCH on which the next uplink CCCH attempt is made in a sequential manner between 1 and k, so that uplink CCCH attempt number i+1 is made on CCCH number x+1, uplink CCCH attempt number i+2 is made on CCCH number x+2, and attempt number i+n is made on CCCH number x+n.

19. The method of claim 17, according to which, in the case of a failed uplink CCCH attempt number i on CCCH number x, the method comprises using the function $f_i$ to alter the CCCH number x on which the next uplink CCCH attempt is made in a cyclic manner from 1 to k.

20. The method of claim 17, according to which, in the case of a failed uplink CCCH attempt number i on CCCH number x, the method comprises using the function $f_i$ to alter the CCCH number x on which the next uplink CCCH attempt is made in a pseudo-random manner between 1 and k.

21. The method of claim 17, according to which the function $f_i$ is also used to prioritize the CCCH number x on which the next uplink CCCH attempt is made according to the traffic class of the traffic for which the MS makes the uplink CCCH attempt.

22. The method of claim 17, according to which the function $f_i$ is also used to determine x in the range of 1 . . . k in a first manner if the MS belongs to a first group of MSs and in a second manner if the MS belongs to a second group of MSs.

23. A network node, for a cellular communications network, being arranged to transmit System Information (SI) messages, to an MS in a cell in the cellular communications network, the network node being further arranged to insert an Information Element (IE) in an SI message, which IE defines which CCCHs in the cell that the MS may use for uplink CCCH access attempts.

24. The network node of claim 23, being a Radio Base Station or a Base Station Controller for a GSM system.

25. The network node of claim 23, being a Radio Network Controller for a WCDMA system.

* * * * *